(12) United States Patent
Shibata et al.

(10) Patent No.: US 8,943,814 B2
(45) Date of Patent: Feb. 3, 2015

(54) WARM-UP SYSTEM FOR EXHAUST SYSTEM OF INTERNAL COMBUSTION ENGINE

(75) Inventors: Daisuke Shibata, Numazu (JP); Toru Kidokoro, Hadano (JP); Hiroshi Sawada, Gotenba (JP); Kazuya Takaoka, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/580,325

(22) PCT Filed: Sep. 6, 2011

(86) PCT No.: PCT/JP2011/070290
§ 371 (c)(1),
(2), (4) Date: Aug. 21, 2012

(87) PCT Pub. No.: WO2013/035163
PCT Pub. Date: Mar. 14, 2013

(65) Prior Publication Data
US 2014/0216020 A1    Aug. 7, 2014

(51) Int. Cl.
| | | |
|---|---|---|
| *F01N 11/00* | (2006.01) | |
| *F01N 3/10* | (2006.01) | |
| *F02D 41/02* | (2006.01) | |
| *F01N 3/035* | (2006.01) | |
| *F01N 13/00* | (2010.01) | |
| *F02D 41/22* | (2006.01) | |
| *F01N 3/20* | (2006.01) | |

(52) U.S. Cl.
CPC .............. *F01N 3/10* (2013.01); *F02D 41/0255* (2013.01); *F01N 11/00* (2013.01); *F01N 3/035* (2013.01); *F01N 13/009* (2013.01); *F02D 41/22* (2013.01); *Y02T 10/26* (2013.01); *F01N 3/2066* (2013.01); *F01N 2550/04* (2013.01); *F01N 2560/05* (2013.01); *F01N 2900/0422* (2013.01); *F01N 2900/08* (2013.01); *F01N 2900/1606* (2013.01); *Y02T 10/47* (2013.01)

USPC ................... 60/320; 60/277; 60/284; 60/300

(58) Field of Classification Search
USPC ........... 60/277, 284, 285, 286, 297, 300, 301, 60/303, 311, 320
See application file for complete search history.

(56) References Cited

U.S. PATENT DOCUMENTS

| | | | |
|---|---|---|---|
| 2002/0007669 A1 | 1/2002 | Ito | |
| 2003/0070423 A1* | 4/2003 | Morinaga et al. ............... | 60/284 |
| 2007/0017213 A1 | 1/2007 | Katou | |

FOREIGN PATENT DOCUMENTS

| | | |
|---|---|---|
| JP | 06-146955 A | 5/1994 |
| JP | 2002-004932 A | 1/2002 |
| JP | 2007-032340 A | 2/2007 |
| JP | 2010-249076 A | 11/2010 |

* cited by examiner

*Primary Examiner* — Thomas Denion
*Assistant Examiner* — Jorge Leon, Jr.
(74) *Attorney, Agent, or Firm* — Sughrue Mion, PLLC

(57) ABSTRACT

A warm-up system for an exhaust system of an internal combustion engine includes an electronic control unit that performs warm-up control for warming up an exhaust system component upon start-up of the internal combustion engine and a failure diagnosis performing module of the electronic control unit that performs failure diagnosis for the exhaust system component after the completion of warm-up of the exhaust system component. If the internal combustion engine repeatedly stops before completion of the failure diagnosis for a predetermined period of time, then the electronic control unit changes the warm-up control performed upon start-up of the internal combustion engine to a control that raises the temperature of the exhaust system component more quickly than the warm-up control performed during the predetermined period.

5 Claims, 9 Drawing Sheets

WARM-UP SYSTEM FOR EXHAUST SYSTEM OF INTERNAL COMBUSTION ENGINE

CROSS REFERENCE TO RELATED APPLICATIONS

THIS APPLICATION IS A NATIONAL STAGE OF INTERNATIONAL APPLICATION NO. PCT/JP2011/070290 FILED Sep. 6, 2011, THE CONTENTS OF ALL OF WHICH ARE INCORPORATED HEREIN BY REFERENCE IN THEIR ENTIRETY.

TECHNICAL FIELD

The present invention relates to a warm-up system for an exhaust system of an internal combustion engine for performing warm-up control of the exhaust system of the internal combustion engine.

BACKGROUND ART

Patent Document 1 discloses a pre-warm-up operation control apparatus for an internal combustion engine, which controls the operation of the internal combustion engine until the completion of warm-up or until the temperature of the exhaust gas purification apparatus provided in the exhaust system of the internal combustion engine becomes equal to or higher than an active temperature. The pre-warm-up operation control apparatus controls the ignition timing in such a way that the ignition timing is retarded from normal ignition timing until the completion of warm-up is detected and keeps the increase rate of the intake air quantity equal to or lower than a predetermined value without regard to the operation of the accelerator.

Patent Document 2 discloses a combustion air-fuel ratio control apparatus for an internal combustion engine. When warm-up of an exhaust gas purification catalyst is requested, the combustion air-fuel ratio control apparatus makes the combustion air-fuel ratio in the combustion chamber rich and actuates a secondary air supply apparatus to supply secondary air to the exhaust passage. When warm-up of the exhaust gas purification catalyst is requested, the combustion air-fuel ratio control apparatus performs an open control to make the combustion air-fuel ratio equal to a first combustion air-fuel ratio at which stable combustion is possible between the theoretical air-fuel ratio and a combustion limit air-fuel ratio that is richer than the theoretical air-fuel ratio, if an exhaust air-fuel ratio sensor provided upstream of the exhaust gas purification catalyst is in an inactive condition. If the exhaust air-fuel ratio sensor is in an active condition, the combustion air-fuel ratio control apparatus performs a feedback control to make the combustion air fuel ratio equal to a second combustion air-fuel ratio that is richer than the aforementioned first air-fuel ratio and close to the combustion limit air-fuel ratio.

PRIOR ART DOCUMENTS

Patent Documents

Patent Document 1: Japanese Patent Application Laid-Open No. 06-146955
Patent Document 2: Japanese Patent Application Laid-Open No. 2007-032340

SUMMARY OF THE INVENTION

Problems to be Solved by the Invention

An exhaust gas purification apparatus composed of an exhaust gas purification catalyst (e.g. oxidation catalyst, three-way catalyst, NOx storage reduction catalyst, or NOx selective reduction catalyst) and a particulate filter is provided in an exhaust passage of an internal combustion engine. In some cases, an air-fuel ratio sensor that measures the air-fuel ratio of the exhaust gas and various sensors that measure the quantity or concentration of specific components (e.g. $O_2$, HC or PM (Particulate Matter) etc.) in the exhaust gas are also provided in the exhaust passage of an internal combustion engine.

A failure diagnosis may be performed for exhaust system components such as the exhaust gas purification apparatus and the sensors. To enable accurate failure diagnosis for exhaust system components, it is necessary that the exhaust gas purification catalyst in the exhaust gas purification apparatus and the sensors be sufficiently activated. In other words, it is necessary that the temperature of the exhaust system components be sufficiently high and that they have been already warmed up.

Therefore, failure diagnosis for exhaust system components is performed after the warm-up of the exhaust system components has been completed after the start of operation of the internal combustion engine. Therefore, if the operation of the internal combustion engine is stopped in a short time after the start of operation, the operation of the internal combustion engine might be stopped before the start of the execution of failure diagnosis for apparatuses in the exhaust apparatus or before the completion of failure diagnosis even if the execution of failure diagnosis has been started, in some cases. If such short-time operations of the internal combustion engine are performed repeatedly, a state in which failure diagnosis for exhaust system components cannot be completed might continue for a long period of time.

The present invention has been made in view of the above-described problem. An object of the present invention is to prevent a situation in which failure diagnosis for an exhaust system component of an internal combustion engine cannot be completed for an unduly long period of time.

Means for Solving the Problems

According to an embodiment of the present invention, if a situation in which the operation of the internal combustion engine is repeatedly stopped before the completion of failure diagnosis for an exhaust system component over a predetermined period of time, then the warm-up control performed after the predetermined period of time has elapsed is changed to a control that can raise the temperature of the exhaust system component more quickly than the warm-up control performed during the predetermined period.

More specifically, a warm-up system for an exhaust system of an internal combustion engine according to the present invention comprises:

a warm-up control performing unit that performs a warm-up control for warming up an exhaust system component provided in an exhaust passage of an internal combustion engine upon start-up of the internal combustion engine; and a failure diagnosis performing unit that performs failure diagnosis for said exhaust system after completion of warm-up of said exhaust system component, wherein if a situation occurs in which the operation of the internal combustion engine is repeatedly stopped before completion of the failure diagnosis for the exhaust system component performed by said failure diagnosis performing unit over a predetermined period of time, then said warm-up control performing unit changes the warm-up control that is performed upon start-up of the internal combustion engine after said predetermined period of time has elapsed to a control that can raise the temperature of said exhaust system component more quickly than the warm-up control performed during said predetermined period.

There may be several exhaust system components. For example, the exhaust system components may include the component for which the failure diagnosis is performed and a component such as a sensor that is used in the failure diagnosis.

By changing the warm-up control performed after the start of operation of the internal combustion engine to a control that can raise the temperature of the exhaust system component more quickly, the failure diagnosis for the exhaust system component can be performed earlier. Thus, according to an embodiment of the present invention, when the failure diagnosis for the exhaust system component is performed after the start of engine operation, but is not completed over a predetermined period of time, the probability that the failure diagnosis for the exhaust system component will be completed increases after the predetermined period has elapsed. Consequently, the situation in which the failure diagnosis for the exhaust system component in the internal combustion engine is unable to be completed can be prevented from continuing for an unduly long period of time.

In cases where the warm-up control is performed using fuel by, for example, retarding of the fuel injection timing or sub fuel injection performed after main fuel injection, an increase in the fuel consumption is necessitated in order to make the speed of rise in the temperature of the exhaust system component higher. In such cases also, in the present invention, the fuel consumption in the warm-up control is prevented from increasing in the predetermined period. Consequently, a deterioration in fuel economy with the change of the warm-up control to the control that can raise the temperature of the exhaust system component more quickly can be made small.

Here, in a time period from the completion of the failure diagnosis for the exhaust system component performed by the failure diagnosis performing unit to a target failure diagnosis completion time, which is a time at which the next failure diagnosis for the exhaust system component should be completed, let a normal warm-up period refer to a period from the time of completion of the failure diagnosis for the exhaust system component until the predetermined period of time elapses, and let an early warm-up period refer to a period from the time at which the normal warm-up period has just elapsed to the target failure diagnosis completion time. If the failure diagnosis for the exhaust system component performed by the failure diagnosis performing unit is not completed during the normal warm-up period, the warm-up control performing unit may change the warm-up control in the early warm-up period to a control that can raise the temperature of the exhaust system component more quickly than the warm-up control performed during the normal warm-up period, thereby shortening the period of time from the start of operation of the internal combustion engine to the completion of warm-up of the exhaust system component.

By this control, the time taken from the start of operation of the internal combustion engine to the completion of the failure diagnosis for the exhaust system component performed by the failure diagnosis performing unit can be shortened during the early warm-up period. Consequently, the probability that the failure diagnosis for the exhaust system component is completed during the early warm-up period can further be increased. In other words, the probability that the failure diagnosis for the exhaust system component is completed by the target failure diagnosis completion time can further be increased.

The warm-up control performing unit may set the value of a parameter relating to the speed of warm-up of the exhaust system component in the warm-up control performed during the early warm-up period, based on the level of progress of the failure diagnosis for the exhaust system component performed by the failure diagnosis performing unit in the normal warm-up period. Specifically, in cases where the operation of the internal combustion engine has been stopped in a state in which the failure diagnosis for the exhaust system component has progressed relatively little during the normal warm-up period, the speed of warm-up of the exhaust system component in the warm-up control performed in the early warm-up period may be set higher than that in cases where the operation of the internal combustion engine has been stopped in a state in which the failure diagnosis for the exhaust system component has progressed relatively far during the normal warm-up period By this control, the less the failure diagnosis for the exhaust system component has progressed during the normal warm-up period, the more the period of time taken from the start of operation of the internal combustion engine to the completion of warm-up of the exhaust system component in the early warm-up period can be shortened. Consequently, the probability that the failure diagnosis for the exhaust system component is completed during the early warm-up period can further be increased.

During the early warm-up period, the warm-up control performing unit may increase the speed of warm-up of the exhaust system component in the warm-up control every time the operation of the internal combustion engine is started, until the failure diagnosis for the exhaust system component performed by the failure diagnosis performing unit is completed. This can further increase the probability that the failure diagnosis for the exhaust system component is completed during the early warm-up period.

The length (or duration) of the next normal warm-up period may be made longer when the failure diagnosis for the exhaust system component performed by the failure diagnosis performing unit is completed early during said early warm-up period than when the failure diagnosis is completed late. This can make the normal warm-up period as long as possible while preventing a situation in which the failure diagnosis for the exhaust system component in the internal combustion engine cannot be completed for an unduly long period of time.

Advantageous Effect of the Invention

According to an embodiment of the present invention, a situation in which the failure diagnosis for the exhaust system component cannot be completed for an unduly long period of time can be prevented.

EMBODIMENTS FOR CARRYING OUT THE INVENTION

In the following, a specific embodiment of the present invention will be described with reference to the drawings. The dimensions, materials, shapes and relative arrangements etc. of the components that will be described in connection with the embodiments are not intended to limit the technical scope of the present invention only to them, unless particularly stated.

Embodiment

In the following, a case in which the exhaust gas purification apparatus for an internal combustion engine according to an embodiment of the present invention is applied to a diesel engine for driving a vehicle will be described. However, the internal combustion engine to which the present invention is applied is not limited to a diesel engine, but it may be, for example, a gasoline or other type of engine.

[General Configuration of Exhaust System of Internal Combustion Engine]

Figure 1:
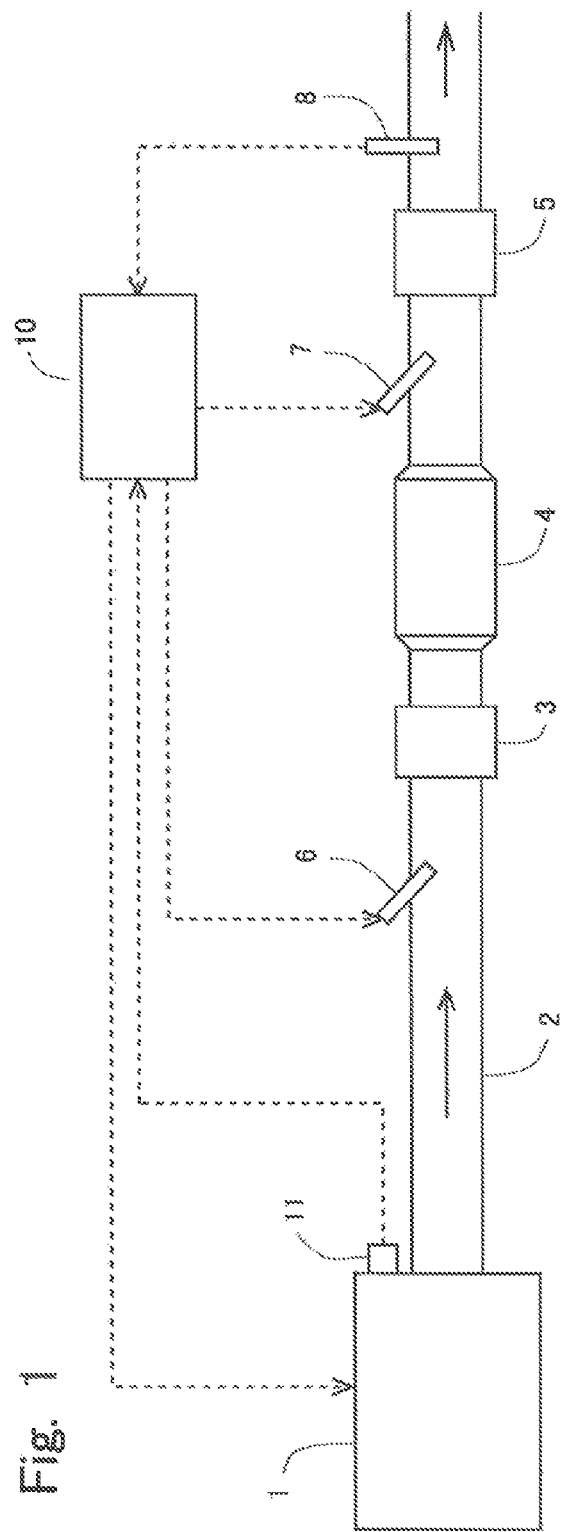
FIG. 1 is a diagram showing the general configuration of the exhaust system of an internal combustion engine according to an embodiment.

FIG. 1 is a diagram showing the general configuration of the exhaust system of an internal combustion engine according to the embodiment. The internal combustion engine 1 is a diesel engine for driving a vehicle. An exhaust passage 2 is connected to the internal combustion engine 1. The arrows in FIG. 1 indicate the direction of flow of the exhaust gas.

In the exhaust passage 2, there are provided, in order from the upstream of the exhaust gas flow, an oxidation catalyst 3, a particulate filter (which will be simply referred to as the "filter" hereinafter) 4, and an NOx selective reduction catalyst 5. The filter 4 traps particulate matter (which will be hereinafter referred to as "PM") in the exhaust gas. A catalyst such as an oxidation catalyst, NOx storage reduction catalyst, or NOx selective reduction catalyst may be supported on the filter 4. The NOx selective reduction catalyst 5 is a catalyst that reduces NOx in the exhaust gas using ammonia as a reducing agent.

A fuel addition valve 6 is provided in the exhaust passage 2 upstream of the oxidation catalyst 3. A urea addition valve 7 is provided in the exhaust passage 2 between the filter 4 and the NOx selective reduction catalyst 5. The urea addition valve 7 adds or supplies aqueous solution of urea to the exhaust gas. A urea tank (not shown) that contains aqueous solution of urea is connected to the urea addition valve 7. Aqueous solution of urea is supplied from the urea tank to the urea addition valve 7. With the addition of aqueous solution of urea through the urea addition valve 7, ammonia is supplied to the NOx selective reduction catalyst 5. Urea supplied to the NOx selective reduction catalyst 5 is adsorbed by the NOx selective reduction catalyst 5. Then, the adsorbed urea is hydrolyzed to generate ammonia. Ammonia thus generated acts as a reducing agent to reduce NOx in the exhaust gas.

A PM sensor 8 is provided in the exhaust passage 2 downstream of the NOx selective reduction catalyst 5. The PM sensor 8 is a sensor that outputs an electrical signal indicative of the amount of PM depositing in itself.

Figure 2:
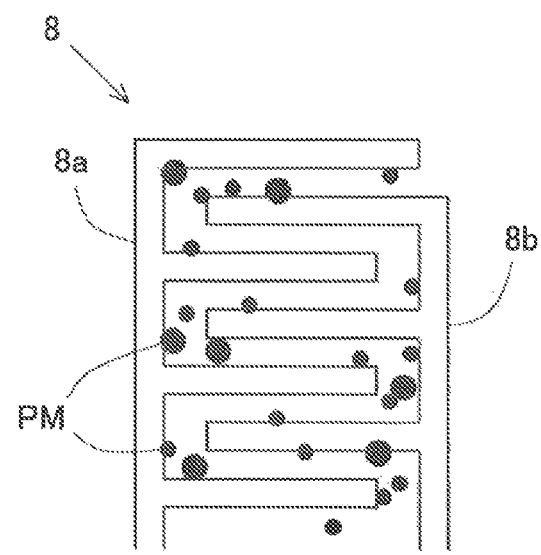
FIG. 2 is a diagram showing the basic construction of a sensor element of a PM sensor according to the embodiment.
Figure 3:
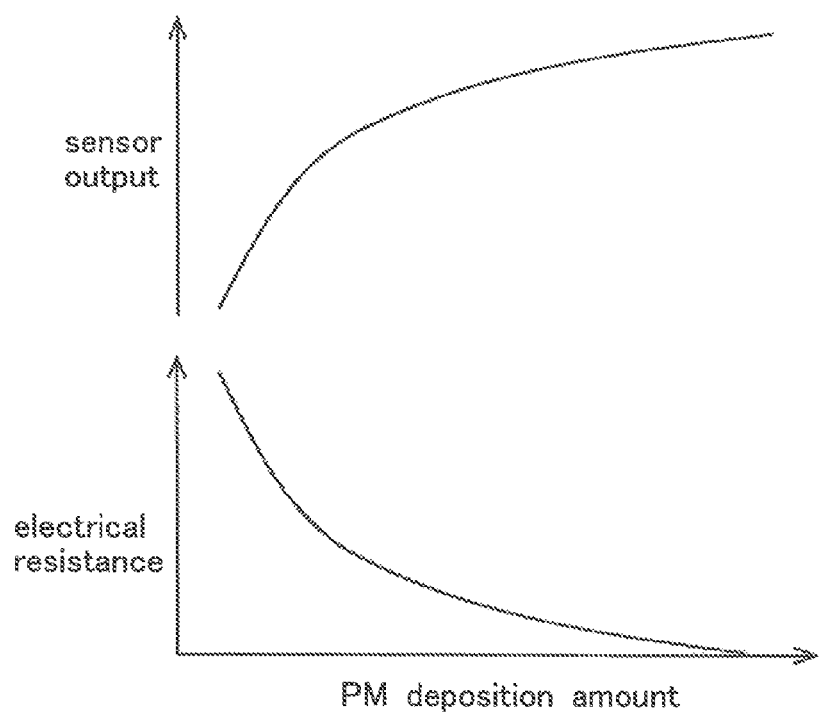
FIG. 3 is a graph showing the relationship between the amount of PM depositing in the PM sensor versus the electrical resistance between the electrodes of the PM sensor and the output of the PM sensor in the embodiment.

Here, details of the PM sensor 8 will be described with reference to FIGS. 2 and 3. FIG. 2 illustrates the basic construction of a sensor element of the PM sensor 8. FIG. 3 is a graph showing the relationship between the amount of PM depositing in the PM sensor 8 versus the electrical resistance between the electrodes 8a, 8b of the PM sensor 8 and the output of the PM sensor 8. In FIG. 3 the horizontal axis represents the amount of PM depositing in the PM sensor 8, the vertical axis in the lower graph represents the electrical resistance between the electrodes 8a, 8b of the PM sensor 8, and the vertical axis in the upper graph represents the output of the PM sensor 8.

As shown in FIG. 2, the sensor element of the PM sensor 8 has a pair of comb-shaped electrodes 8a, 8b. PM (particulate matter) in the exhaust gas adheres to the PM sensor 8 and the adhering PM deposits gradually. As the amount of PM depositing in the PM sensor 8 increases, the amount of PM existing between the electrodes 8a, 8b increases.

Therefore, the larger the amount of PM depositing in the PM sensor 8 is, the lower the electrical resistance between the electrodes 8a, 8b is, as shown in FIG. 3. The lower the electrical resistance between the electrodes 8a, 8b is, the higher the output of the PM sensor 8 is. Therefore, the output of the PM sensor 8 has a value representing the amount of PM depositing in the PM sensor 8.

As the amount of PM existing between the electrodes 8a, 8b changes, electrical properties other than electrical resistance, such as the current flowing between the electrodes 8a, 8b, also change. Therefore, the PM sensor 8 may be adapted to output a signal representing the amount of PM depositing in it based on an electrical property other than the electrical resistance. The PM sensor according to this embodiment is not limited to a sensor that outputs a signal representing the amount of PM depositing in it, but it may be a sensor that outputs a signal representing the quantity (or flow rate) of PM in the exhaust gas.

An electronic control unit (ECU) 10 is annexed to the internal combustion engine 1. The ECU 10 is a unit that controls the operating state etc. of the internal combustion engine 1. Various sensors including the PM sensor 8 and a crank angle sensor 11 are electrically connected to the ECU 10. The crank angle sensor 11 measures the crank angle of the internal combustion engine 1. Signals output from the sensors are input to the ECU 10. The ECU 10 calculates the engine speed of the internal combustion engine 1 based on the measurement value of the crank angle sensor 11.

A fuel addition valve 6 and the urea addition valve 7 are electrically connected to the ECU 10. These components are controlled by the ECU 10.

In this embodiment, the oxidation catalyst 3, the filter 4, the NOx selective reduction catalyst 5 and the PM sensor 8 are exhaust system components in the context of the present invention. However, the exhaust system components in the context of the present invention are not limited to them, but they may include other exhaust gas purification catalyst(s) and other sensor(s) (sensor(s) that measures the quantity or concentration of specific component(s) in the exhaust gas).

[Filter Failure Diagnosis]

PM trapped by the filter 4 gradually deposits in it. In this embodiment, what is called a filter regeneration process is performed, in which the temperature of the filter 4 is raised to a temperature at which PM can be oxidized, to remove the deposited PM. The filter regeneration process is implemented by adding fuel to the exhaust gas through the fuel addition valve 6. The fuel added through the fuel addition valve 6 is oxidized in the oxidation catalyst 3. The temperature of the exhaust gas flowing into the filter 4 is raised by the oxidation heat generated by the oxidation of fuel. Consequently, the temperature of the filter 4 rises, and PM is oxidized and removed.

As described above, the execution of the filter regeneration process makes the temperature of the filter 4 high. Then, a failure in the filter 4, such as break or melting, might result in some cases. In view of this, in this embodiment, failure diagnosis for determining whether or not there is a failure in the filter 4 is performed by the ECU 10. The failure diagnosis for the filter 4 in this embodiment is performed based on the value of the output of the PM sensor 8.

When a failure such as break or melting of the filter 4 occurs, the quantity of PM passing through the filter 4 becomes larger as compared to that at the time when the filter 4 is in a normal condition. Consequently, the quantity of PM depositing in the PM sensor 8 per unit time becomes larger. Therefore, if the change in the value of the output of the PM sensor 8 during a predetermined diagnosis period exceeds a predetermined threshold value, the ECU 10 determines that a failure of filter 4 occurs.

The predetermined diagnosis period is a period during which the amount of PM depositing in the PM sensor 8 can be considered to increase so much that it can be determined whether or not a failure of the filter 4 occurs. This period is determined in advance based on, for example, an experiment. The predetermined threshold value is also determined in advance based on, for example, an experiment. The predetermined threshold value may be varied during the predetermined diagnosis period, based on the operation state of the internal combustion engine.

In order to determine whether or not a failure of the filter 4 occurs with high accuracy in the failure diagnosis for the filter 4, it is necessary that the PM sensor 8 have been sufficiently activated. Specifically, it is necessary that the warm-up of the PM sensor 8 have been completed.

In the embodiment, warm up control for the exhaust system components including the PM sensor 8 is implemented by retarding the fuel injecting timing in the internal combustion engine 1 from the fuel injection timing in the normal case, which is near the top dead center (i.e. after the completion of warm-up control) after the start of operation of the internal combustion engine 1, and increasing the fuel injection quantity as compared to the fuel injection quantity in the normal case. Controlling the fuel injection timing and the fuel injection quantity in this way can cause a rise in the temperature of the exhaust gas while maintaining the output torque of the internal combustion engine 1. Consequently, warm-up of the exhaust system components can be promoted.

The implementation of warm-up control for the exhaust system components according to the present invention is not limited to that described above. The temperature of the exhaust gas may be raised by, for example, executing sub fuel injection at a time after main fuel injection in the internal combustion engine 1. Alternatively, the warm-up control may be implemented by using an electric heater or the like.

The failure diagnosis for the filter 4 is performed after the warm-up of the PM sensor 8 has been completed after the start of operation of the internal combustion engine 1. Therefore, it takes some time from the start of operation of the internal combustion engine 1 until the failure diagnosis for the filter 4 is started. In particular, since the PM sensor 8 is located downstream of the NOx selective reduction catalyst 5 in the exhaust passage 2 in this embodiment, the temperature of the PM sensor 8 is hard to raise. Consequently, it takes time for the warm-up of the PM sensor 8 to be completed. It also takes some time from the start of the failure diagnosis for the filter 4 to the completion of the failure diagnosis. Therefore, if the operation of the internal combustion engine 1 is stopped in a short time after the start of operation, the operation of the internal combustion engine 1 might be stopped before the start of execution of the failure diagnosis for the filter 4 or before the completion of the failure diagnosis, even if the execution of the failure diagnosis is started.

Figure 4:
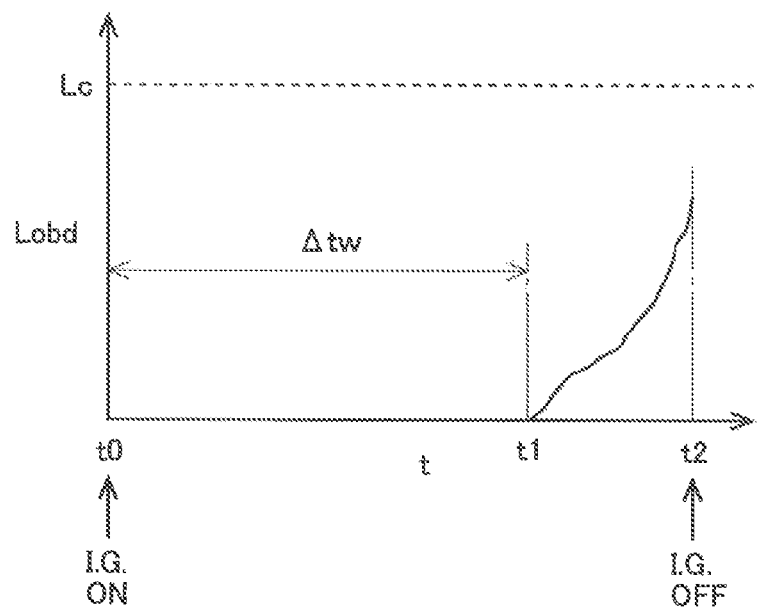
FIG. 4 is a time chart showing the level of progress of failure diagnosis for a filter after the start of operation of the internal combustion engine, in an exemplary case.

FIG. 4 is a time chart showing the level of progress of the failure diagnosis for the filter 4 after the start of operation of the internal combustion engine 1 in an exemplary case. In FIG. 4, the horizontal axis represents the elapsed time t after the start of operation of the internal combustion engine 1, and the vertical axis represents the level of progress Lobd of the failure diagnosis for the filter 4. In FIG. 4, Lc indicates the level of completion of the failure diagnosis for the filter 4. In other words, if the level of progress Lobd of the failure diagnosis for the filter 4 reaches the level of completion Lc, it is determined that the failure diagnosis for the filter 4 is completed.

In FIG. 4, the operation of internal combustion engine is started at time t0 (IGNITION (IG) ON). The time period $\Delta tw$ from t0 to t1 is the warm-up period for the exhaust system components. Then, the failure diagnosis for the filter 4 is started from the time t1 of completion of warm-up of the PM sensor 8. Thereafter, the operation of the internal combustion engine 1 is stopped at time t2 (IGNITION (IG) OFF). In the case shown in FIG. 4, the level of progress Lobd of the failure diagnosis for the filter 4 has not reached the level of completion Lc at time t2. This means that the operation of the internal combustion engine 1 is stopped before completion of the failure diagnosis for the filter 4.

Figure 5:
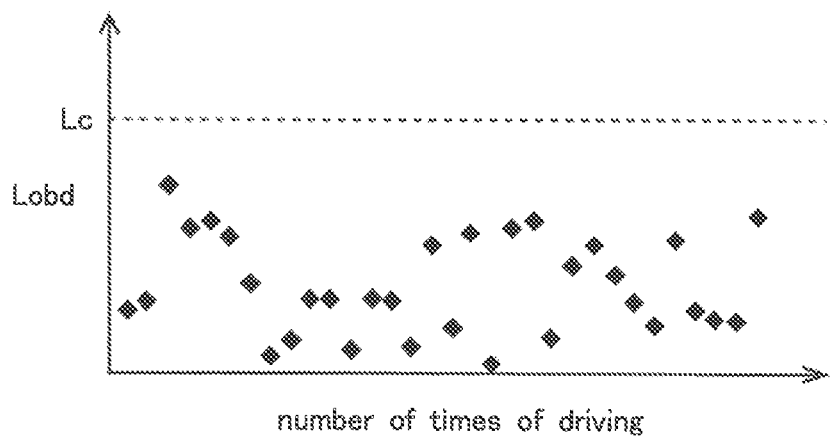
FIG. 5 is a diagram showing the level of progress Lobd of the failure diagnosis for the filter for every occasion of driving of the vehicle on which the internal combustion engine is mounted, in an exemplary case.

FIG. 5 shows the level of progress Lobd of the failure diagnosis for the filter 4 for every occasion of driving of the vehicle on which the internal combustion engine is mounted (i.e. every occasion of operation of the internal combustion engine 1) in an exemplary case. In FIG. 5, the horizontal axis represents the number of times of driving of the vehicle, and the vertical axis represents the level of progress Lobd of the failure diagnosis for the filter 4. In the case shown in FIG. 5, the level of progress Lobd of the failure diagnosis for the filter 4 does not reach the level of completion Lc in any occasion of driving. Putting it differently, FIG. 5 shows a case in which a situation in which the operation of the internal combustion engine 1 is repeatedly stopped before completion of the failure diagnosis for the filter 4.

[Warm-Up Control for Exhaust System Components]

If such a short-time operation of the internal combustion engine 1 is performed repeatedly over a long period of time, the situation in which the failure diagnosis for the filter 4 cannot be completed might continue for a long period of time. In this embodiment, in order to prevent the situation in which the failure diagnosis for the filter 4 cannot be completed for a long period of time, the warm-up speed in the warm-up control for the exhaust system components after the start of operation of the internal combustion engine 1 is controlled.

Figure 6:
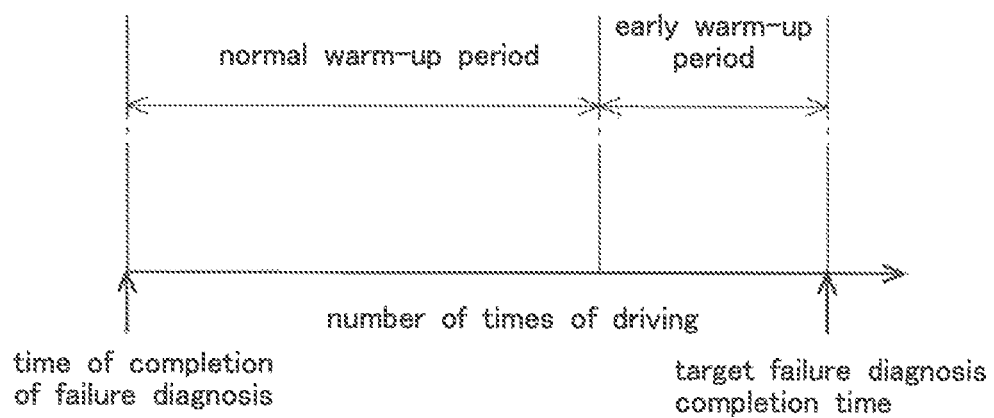
FIG. 6 is a diagram showing the relationship between a target failure diagnosis completion time, a normal warm-up period, and an early warm-up period according to the embodiment.

FIG. 6 is a diagram showing the relationship between the target failure diagnosis completion time, a normal warm-up period, and an early warm-up period, which will be described later. In this embodiment, at the time when the failure diagnosis for the filter 4 is completed, a target failure diagnosis completion time, which is the time at which the next failure diagnosis for the exhaust system component should be completed is set. The time period from the completion of the failure diagnosis for the filter 4 to the next target failure diagnosis completion time is determined in advance based on, for example, an experiment. In addition, a predetermined time period from the time of completion of the failure diagnosis for the filter 4 to a certain time point earlier than the next target failure diagnosis completion time is set as the normal warm-up period. Furthermore, a time period from the time at which the normal warm-up period has just elapsed since the time of completion of the failure diagnosis for the filter 4 to the next target failure diagnosis completion time is set as the early warm-up period. As shown in FIG. 6, in this embodiment, the time period from the time of completion of the failure diagnosis for the filter 4 to the next target failure diagnosis completion time, the normal warm-up period, and the early warm-up period are expressed in units of the number of times of driving of the vehicle. Alternatively, these periods may be expressed in units of the elapsed time.

After the failure diagnosis for the filter 4 is completed, if a short time operation of the internal combustion engine 1 is repeated in the normal warm-up period to leave the next failure diagnosis for the filter 4 incomplete, the warm-up control is changed in the early warm-up period to a control with a warm-up speed higher than that in the warm-up control performed during the normal warm-up period. Specifically, in the warm-up control in the early warm-up period, the fuel injection timing in the internal combustion engine 1 is retarded from the fuel injection timing in the warm-up control in the normal warm-up period, and the fuel injection quantity is made larger than the fuel injection quantity in the warm-up control in the normal warm-up period. This control can make the temperature of the exhaust gas higher during the execution of the warm-up control in the early warm-up period than that during the execution of the warm-up control in the normal warm-up period while maintaining the output torque of the internal combustion engine 1. Higher exhaust gas temperatures enable faster temperature rises of the exhaust system components including the PM sensor 8. Hereinafter, the warm-up control performed in the normal warm-up period will be referred to as normal warm-up control, and the warm-up control performed in the early warm-up period will be referred to as early warm-up control.

In the early warm-up period, warm-up of the PM sensor 8 can be completed earlier by changing the warm-up control to the early warm-up control. Consequently, the failure diagnosis for the filter 4 can be performed earlier. Thus, the time taken from the start of operation of the internal combustion engine 1 to the completion of the failure diagnosis for the filter 4 can be made shorter in the early warm-up period than in the normal warm-up period. Therefore, according to this embodiment, in cases where the failure diagnosis for the filter 4 has not been completed in the normal warm-up period after the start of operation of the internal combustion engine 1, the probability that the failure diagnosis for the filter 4 is completed in the early warm-up period can be increased. In other words, the probability that the next failure diagnosis for the filter 4 is completed by the target failure diagnosis completion time can be increased. Therefore, the situation in which the failure diagnosis for the filter 4 cannot be completed for an unduly long period of time can be prevented.

Performing the early warm-up control makes the fuel consumption with the execution of the early warm-up control larger as compared to that with the execution of the normal warm-up control. However, in this embodiment, during the normal warm-up period the normal warm-up control is performed. Only in cases where the failure diagnosis for the filter 4 is not completed in the normal warm-up period, the early warm-up control is performed during the early warm-up period. Therefore, deterioration in the fuel economy can be made smaller than that in the case where the early warm-up control is always performed as the warm-up control (namely, in the case where the early warm-up control is performed also during the normal warm-up period).

Figure 7:
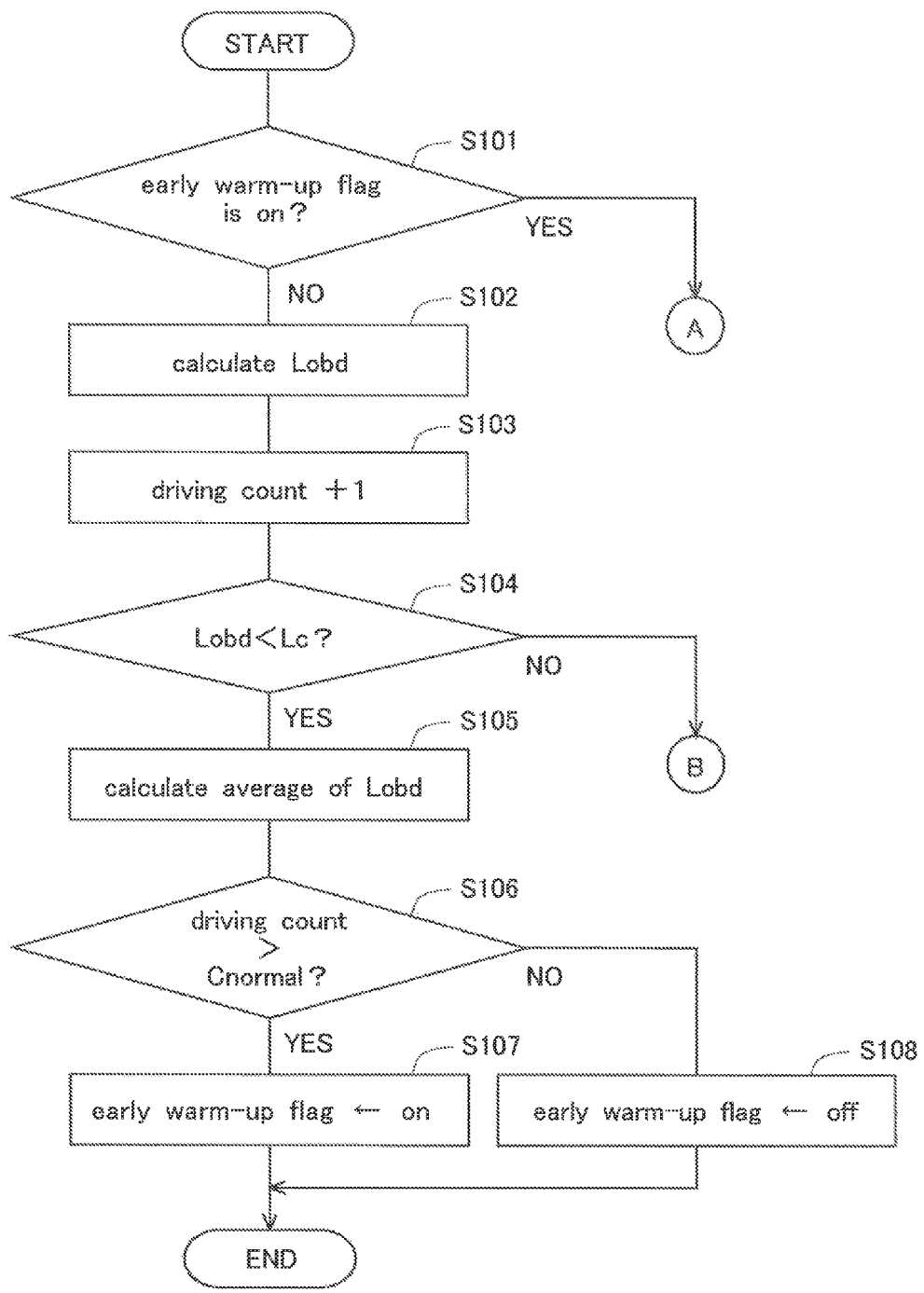
FIG. 7 is a part of a flow chart of a process of setting the warm-up control for an exhaust system component according to the embodiment.
Figure 8:
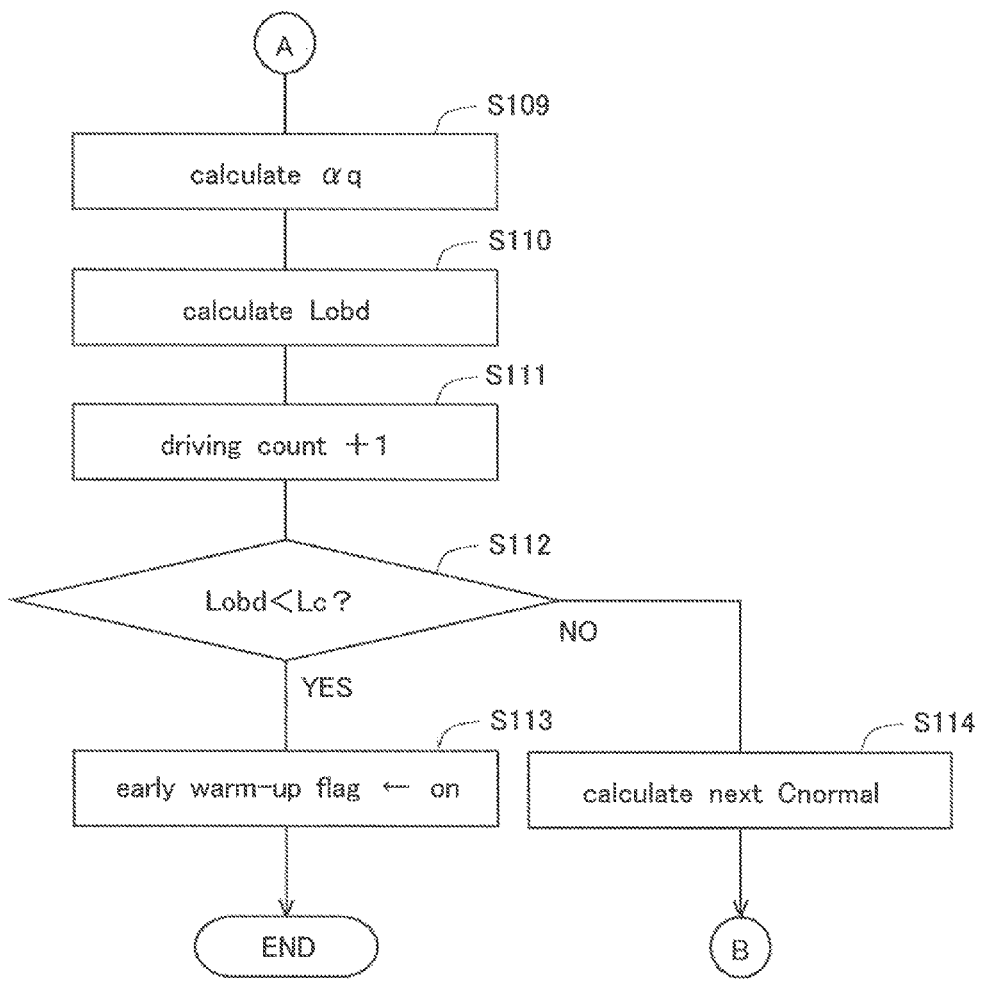
FIG. 8 is a part of the flow chart of the process of setting the warm-up control for the exhaust system component according to the embodiment.
Figure 9:
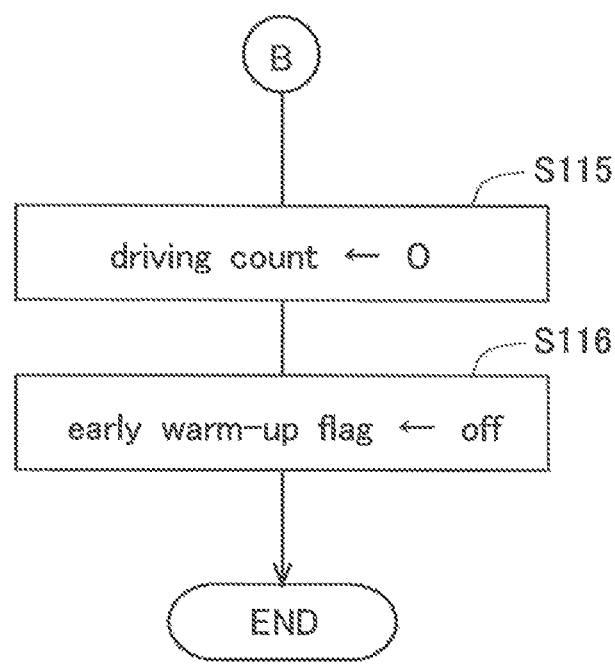
FIG. 9 is a part of the flow chart of the process of setting the warm-up control for the exhaust system component according to the embodiment.

In the following, the process of setting of warm-up control for an exhaust system component according to this embodiment will be described with reference to the flow chart of FIGS. 7 to 9. This process is stored in the ECU and executed by the ECU 10 every time the vehicle on which the internal combustion engine 1 is mounted is driven.

Firstly in step S101 of this process, it is determined whether or not an early warm-up flag is ON. If the early warm-up flag is ON, the early warm-up control is selected as the warm-up control. On the other hand, if the early warm-up flag is OFF, the normal warm-up control is selected as the warm-up control. If the determination in step S101 is negative, the processing of step S102 is executed next. If the determination is affirmative, the processing of step S109 is executed next.

In step S102, the level of progress Lobd of the failure diagnosis for the filter 4 in the present driving of the vehicle is calculated. The level of progress Lobd of the failure diagnosis for the filter 4 may be calculated from the time at which the operation of the internal combustion engine 1 is started or the time at which warm-up of exhaust system components is completed to the time at which operation of the internal combustion engine 1 is stopped. In cases where failure diagnosis for exhaust system components other than the filter 4 is additionally performed, the level of progress Lobd of the failure diagnosis may be calculated as the number of items, among the items of the failure diagnosis, for which the failure diagnosis has been completed until the operation of the internal combustion engine 1 is stopped.

Then in step S103, the count of driving of the vehicle (i.e. the number of times of driving of the vehicle since the last completion of the failure diagnosis for the filter 4) is incremented by one. Then in step S104, it is determined whether or not the level of progress Lobd of the failure diagnosis for the filter 4 calculated in step S102 is lower than the level of completion Lc of the failure diagnosis for the filter 4.

If the determination in step S104 is affirmative, it may be concluded that in the driving of the vehicle of this time, the operation of the internal combustion engine 1 was stopped at a time when the failure diagnosis for the filter 4 had not been completed yet. In this case, the processing of step S105 is executed next. On the other hand, if the determination in step S104 is negative, it may be concluded that in the driving of the vehicle of this time, the operation of the internal combustion engine 1 was stopped after the failure diagnosis for the filter 4 had been completed. In this case, the processing of step S115 is executed next.

In step S105, the average of the level of progress Lobd of the failure diagnosis for the filter 4 is calculated for the occasions of driving of the vehicle during the time period from the time of last completion of the failure diagnosis for the filter 4 to the present (namely, during the normal warm-up period). Next in step S106, it is determined whether or not the driving count of the vehicle at the present time exceeds the normal warm-up period Cnormal.

If the determination in step S106 is affirmative, the early warm-up flag is changed to ON next in step S107. In this case, the early warm-up control will be performed as the warm-up control on the next occasion of driving of the vehicle. Furthermore, an affirmative determination will be made in step S101 in the next execution of this process. On the other hand, if the determination in step S106 is negative, the early warm-up flag is maintained to be OFF next in step S108. In this case, the normal warm-up control will be performed as the warm-up control on the next occasion of driving of the vehicle as with the present control. Furthermore, a negative determination will be made in step S101 in the next execution of this process.

In step S109, the value of an early warm-up parameter $\alpha q$ used in the early warm-up control executed at this time is calculated. The early warm-up parameter $\alpha q$ is a parameter that relates to the speed of warm-up of the exhaust system components. The larger the value of the early warm-up parameter $\alpha q$ is, the higher the speed of warm-up of the exhaust system components during the execution of the early warm-up control is. Specifically, the larger the value of the early warm-up parameter $\alpha q$ is, the more the fuel injection timing is retarded and the more the fuel injection quantity is increased in the early warm-up control. Consequently, the temperature of the exhaust gas discharged from the internal combustion engine 1 will become higher, and the speed of warm-up of the exhaust system components will become higher.

Figure 10:
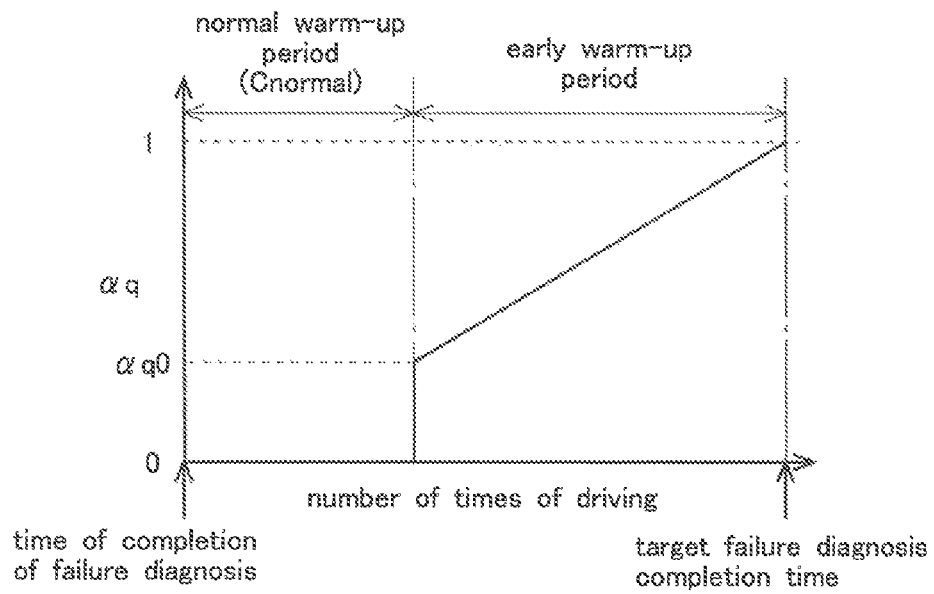
FIG. 10 a diagram showing the relationship between the driving count of the vehicle and an early warm-up parameter $\alpha q$ according to the embodiment.
Figure 11:
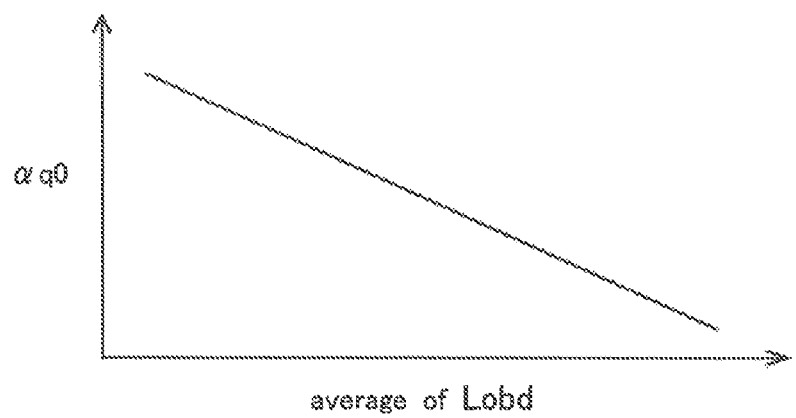
FIG. 11 is a diagram showing the relationship between the average of the level of progress Lobd of the failure diagnosis for the filter for the occasions of driving of the vehicle during the normal warm-up period and the initial value $\alpha q0$ of the early warm-up parameter in the early warm-up period, according to the embodiment.

FIG. 10 is a diagram showing the relationship between the driving count of the vehicle and the early warm-up parameter $\alpha q$. In FIG. 10 the horizontal axis represents the driving count of the vehicle, and the vertical axis represents the early warm-up parameter $\alpha q$. FIG. 11 is a diagram showing the relationship between the average of the level of progress Lobd of the failure diagnosis for the filter 4 calculated in step S105 for the occasions of driving of the vehicle during the normal warm-up period and the initial value $\alpha q0$ of the early warm-up parameter in the early warm-up period (i.e. the value of the early control parameter used in the early warm-up control executed on the first occasion of driving of the vehicle in the early warm-up period). In FIG. 11 the horizontal axis represents the average of the level of progress Lobd of the failure diagnosis for the filter 4 for the occasions of driving of the vehicle during the normal warm-up period, and the vertical axis represents the initial value $\alpha q0$ of the early warm-up parameter in the early warm-up period.

As shown in FIG. 11, the initial value $\alpha q0$ of the early warm-up parameter in the early warm-up period is calculated based on the average of the level of progress Lobd of the failure diagnosis for the filter 4 for the occasions of driving of the vehicle during the normal warm-up period. The smaller the average of the level of progress Lobd of the failure diagnosis for the filter 4 for the occasions of driving of the vehicle during the normal warm-up period is, the larger the initial value $\alpha q0$ of the early warm-up parameter in the early warm-up period is calculated to be. In other words, the lower the level of progress of the failure diagnosis for the filter 4 during the normal warm-up period is, the higher the speed of warm-up of the exhaust system components in the early warm-up control executed on the first occasion of driving of the vehicle in the early warm-up period is made. With this control, the lower the level of progress of the failure diagnosis for the filter 4 during the normal warm-up period is, the shorter the time taken from the start of the internal combustion engine 1 on the first occasion of driving of the vehicle in the early warm-up period to the completion of warm-up of the exhaust system components can be made.

During the early warm-up period, the value of the early warm-up parameter $\alpha q$ is made larger as the driving count increases, as shown in FIG. 10. Specifically, during the early warm-up period, the speed of warm-up of the exhaust system components in the early warm-up control is increased every time the vehicle is driven (i.e. every time the operation of the internal combustion engine 1 is started), until the failure diagnosis for the filter 4 is completed. This can shorten the time taken from the start of operation of the internal combustion engine 1 to the completion of warm-up of the exhaust system components every time the vehicle is driven during the early warm-up period, until the failure diagnosis for the filter 4 is completed.

The shorter the time from the start of operation of the internal combustion engine 1 to the completion of warm-up of the exhaust system components is, the higher the probability that the failure diagnosis for the filter 4 is completed before the operation of the internal combustion engine 1 is stopped is. Therefore, by setting the early warm-up parameter $\alpha q$ used in the early warm-up period in the above described manner, the probability that the failure diagnosis for the filter 4 is completed during the early warm-up period can be made higher.

In this embodiment, the relationship shown in FIG. 10 between the driving count of the vehicle and the early warm-up parameter $\alpha q$ and the relationship shown in FIG. 11 between the average of the level of progress Lobd of the failure diagnosis for the filter 4 for the occasions of driving of the vehicle during the normal warm-up period and the initial value $\alpha q0$ of the early warm-up parameter in the early warm-up period are stored in the ECU 10 as maps or functions. In step S109, the value of the early warm-up parameter $\alpha q$ is calculated using the maps or functions.

The value of the early warm-up parameter $\alpha q$ does not necessarily need to be set in the above-described manner. For instance, the value of the early warm-up parameter $\alpha q$ in the early warm-up period may be set to be constant regardless of the driving count of the vehicle. In this case also, the smaller the average of the level of progress Lobd of the failure diagnosis for the filter 4 for the occasions of driving of the vehicle during the normal warm-up period is, the larger the value of the early warm-up parameter $\alpha q$ is made, whereby the probability that the failure diagnosis for the filter 4 is completed during the early warm-up period can be made higher. However, setting the value of the early warm-up parameter $\alpha q$ in the above-described manner can make the probability that the failure diagnosis for the filter 4 is completed during the early warm-up period even higher and can make the fuel consumption with the execution of the early warm-up control smaller.

After the processing of step S109, the processing of step S110 is executed. In step S110, the level of progress Lobd of the failure diagnosis for the filter 4 in the driving of the vehicle of this time is calculated. Next in step S111, the driving count of the vehicle is incremented by one. Next in step S112, it is determined whether or not the level of progress Lobd of the failure diagnosis for the filter 4 calculated in step S110 is lower than the level of completion LC of the failure diagnosis for the filter 4.

If the determination in step S112 is affirmative, it may be concluded that the operation of the internal combustion engine 1 was stopped before completion of the failure diagnosis for the filter 4 in the driving of the vehicle of this time. In this case, the processing of step S113 is executed next. In step S113, the early warm-up flag is maintained to be ON. Consequently, the early warm-up control will be performed as the warm-up control on the next occasion of driving of the vehicle as with the present control. Furthermore, an affirmative determination will be made in step S101 in the next execution of this process.

On the other hand, if the determination in step S112 is negative, it may be concluded that the operation of the internal combustion engine 1 was stopped after the failure diagnosis for the filter 4 had been completed in the driving of the vehicle of this time. In this case, the processing of step S114 is executed next. In step S114, the length (or duration) of the next normal warm-up period Cnormal is calculated.

Figure 12:
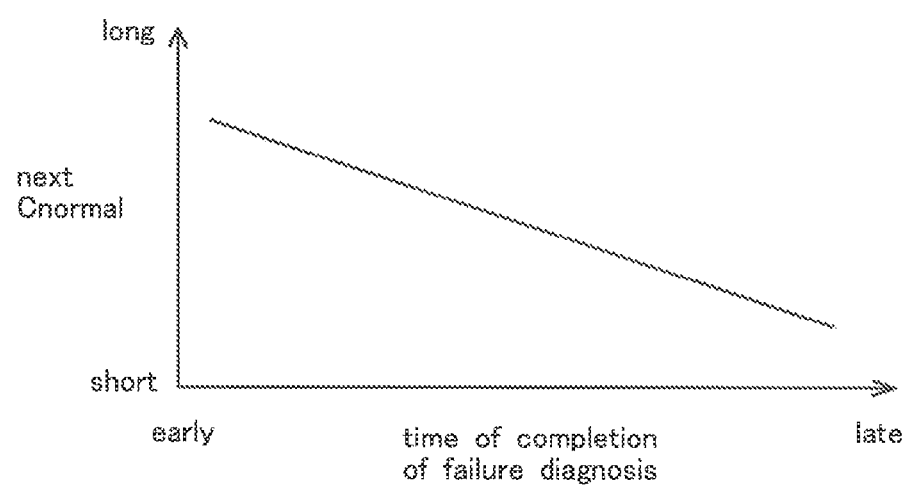
FIG. 12 is a diagram showing the relationship between the time of completion of the failure diagnosis for the filter during the early warm-up period of this time and the length of the next normal warm-up period Cnormal.

FIG. 12 is a diagram showing the relationship between the time of completion of the failure diagnosis for the filter 4 during this early warm-up period and the length of the next normal warm-up period Cnormal. In FIG. 12, the horizontal axis represents the time of completion of the failure diagnosis for the filter 4 during this early warm-up period, and the vertical axis represents the length of the next normal warm-up period Cnormal.

As shown in FIG. 12, the length of the next normal warm-up period Cnormal is calculated based on the time of completion of the failure diagnosis for the filter 4 during this early warm-up period. In the calculation, the earlier the time of completion of the failure diagnosis for the filter 4 during this early warm-up period is, the longer the next normal warm-up period Cnormal is calculated to be. The reason for the above is that if the time of completion of the failure diagnosis for the filter 4 during this early warm-up period is relatively early, making the probability that the failure diagnosis for the filter 4 is completed at an early time after the shift to the early warm-up period higher, even if the next normal warm-up period is made longer and the failure diagnosis for the filter 4 has not been completed during the normal warm-up period.

By setting the next normal warm-up period Cnormal in the above-described fashion, the normal warm-up period can be made as long as possible while preventing a situation in which the failure diagnosis for the filter 4 cannot be completed by the target failure diagnosis completion time from occurring. The longer normal warm-up period makes the probability that the failure diagnosis for the filter 4 is completed during the normal warm-up period higher. Thus, it is possible to reduce the occasions in which the early warm-up control is performed. Consequently, deterioration of fuel economy, which might be caused by performing the early warm-up control, can be reduced.

In this embodiment, the relationship shown in FIG. 12 between the time of completion of the failure diagnosis for the filter 4 during the early warm-up period of this time and the length of the next normal warm-up period Cnormal is stored as a map or function in the ECU 10. In step S114, the length of the next normal warm-up period Cnormal is calculated using the map or function.

After the processing of step S114, the processing of step S115 is executed. In step S115, the driving count is reset to zero. This is because the failure diagnosis for the filter 4 has been completed. Next in step S116, the early warm-up flag is changed to OFF. Thus, the next normal warm-up period starts from the time when the failure diagnosis for the filter 4 of this time is completed.

By the above-described process, deterioration of fuel economy caused by performing the warm-up control can be made as small as possible while preventing a situation in which the failure diagnosis for the filter 4 cannot be completed by the target failure diagnosis completion time for an unduly long period of time.

While an embodiment in which the present invention is applied to filter failure diagnosis has been described in the foregoing, the present invention can also be applied to failure diagnosis for other exhaust system components such as an exhaust gas purification catalysts and sensors. In cases where failure diagnosis for other exhaust system components is performed upon start-up of the internal combustion engine also, it is necessary that warm-up of the exhaust system components has been completed before performing the failure diagnosis. Therefore, in cases where failure diagnosis is performed for other exhaust system components also, warm-up control of the exhaust system components is performed in a similar manner as with the case where the above described filter failure diagnosis is performed. This can make deterioration of fuel economy caused by performing the warm-up control as small as possible while preventing a situation in which failure diagnosis for another exhaust system component that is a subject of the failure diagnosis cannot be completed for an unduly long period of time.

DESCRIPTION OF THE REFERENCE SIGNS

1: internal combustion engine
2: exhaust passage
3: oxidation catalyst
4: particulate filter (filter)
5: NOx selective reduction catalyst
6: fuel addition valve
7: urea addition valve
8: PM sensor
10: ECU
11: crank angle sensor

The invention claimed is:

1. A warm-up system for an exhaust system of an internal combustion engine comprising:
an electronic control unit configured to perform a warm-up control for warming up an exhaust system component provided in an exhaust passage of the internal combustion engine upon start-up of the internal combustion engine, said electronic control unit further configured to perform failure diagnosis for said exhaust system component after completion of warm-up of said exhaust system component,
wherein if an operation of the internal combustion engine is repeatedly stopped before completion of the failure diagnosis for a predetermined period of time, then said electronic control unit changes the warm-up control that is performed upon start-up of the internal combustion engine to a control that raises a temperature of said exhaust system component more quickly than the warm-up control performed during said predetermined period.

2. The warm-up system for the exhaust system of the internal combustion engine according to claim 1, wherein during a time period from completion of the failure diagnosis for said exhaust system component performed by said electronic control unit to a target failure diagnosis completion time, which is a time at which a next failure diagnosis for said exhaust system component should be completed, a normal warm-up period refers to a period from the time of completion of the failure diagnosis for said exhaust system component until said predetermined period of time elapses, and an early warm-up period refers to a period from the time at which the normal warm-up period has just elapsed to said target failure diagnosis completion time, and wherein if the failure diagnosis for said exhaust system component performed by said electronic control unit is not completed during said normal warm-up period, then said electronic control unit changes the warm-up control in said early warm-up period to a control that raises the temperature of said exhaust system component more quickly than the warm-up control performed during said normal warm-up period, thereby shortening a period of time from a start of operation of said internal combustion engine to completion of warm-up of said exhaust system component.

3. The warm-up system for the exhaust system of the internal combustion engine according to claim 2, wherein said electronic control unit sets a value of a parameter relating to a speed of warm-up of said exhaust system component in the warm-up control performed during said early warm-up period, based on a level of progress of failure diagnosis for said exhaust system component performed by said electronic control unit in said normal warm-up period.

4. The warm-up system for the exhaust system of the internal combustion engine according to claim 2, wherein during said early warm-up period, said electronic control unit increases the speed of warm-up of said exhaust system component in the warm-up control every time the operation of the internal combustion engine is started, until the failure diagnosis for said exhaust system component performed by said electronic control unit is completed.

5. The warm-up system for the exhaust system of the internal combustion engine according to claim 2, wherein a length of a next normal warm-up period is made longer when the failure diagnosis for said exhaust system component performed by said electronic control unit is completed early during said early warm-up period than when the failure diagnosis is completed late.

* * * * *